United States Patent
Bletzinger

(10) Patent No.: US 6,831,421 B1
(45) Date of Patent: Dec. 14, 2004

(54) SHUNT-INDUCED HIGH FREQUENCY EXCITATION OF DIELECTRIC BARRIER DISCHARGES

(75) Inventor: Peter Bletzinger, Fairborn, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/402,869

(22) Filed: Mar. 24, 2003

(51) Int. Cl.$^7$ .......................... H01B 37/00; H01B 37/02

(52) U.S. Cl. ...................................... 315/207; 315/224

(58) Field of Search ................................ 315/224, 205, 315/207, 248, 209, 111.21, 219, 276; H05B 37/00, 37/02

(56) References Cited

U.S. PATENT DOCUMENTS

| | | | |
|---|---|---|---|
| 3,725,733 A | 4/1973 | Mack et al. ................. | 315/228 |
| 4,027,169 A | 5/1977 | Lowther ..................... | 250/536 |
| 4,087,807 A | 5/1978 | Miavecz ..................... | 340/324 M |
| 4,957,606 A | 9/1990 | Juvan .......................... | 204/164 |
| 5,604,410 A | 2/1997 | Vollkommer et al. ....... | 315/246 |
| 6,239,559 B1 * | 5/2001 | Okamoto et al. ........... | 315/307 |
| 6,245,299 B1 * | 6/2001 | Shiloh et al. ............... | 422/121 |
| 6,356,033 B1 * | 3/2002 | Okamoto et al. ........ | 315/209 R |

FOREIGN PATENT DOCUMENTS

JP          8-31585       *   2/1996   ........... H05B/41/24

OTHER PUBLICATIONS

E. Smulders et al., "Pulsed Power Corona Discharges for Air Pollution Control", IEEE Transactions on Plasma Science, Oct. 1998, pp. 1476–1484, vol. 26, No. 5.

S. Liu et al., "Excitation of Dielectric Barrier Discharges by Unipolar Submicrosecond Square Pulses", J. Phys. D: Appl. Phys., 2001, pp. 1632–1638, vol. 34.

J. Lowke et al., "Theoretical Analysis of Removal of Oxides of Sulphur and Nitrogen in Pulsed Operation of Electrostatic Precipitators", IEEE Transactions on Plasma Science, Aug. 1995, pp. 661–671, vol. 23, No. 4.

B. Eliasson et al., "Modeling and Applications of Silent Discharge Plasmas", IEEE Transactions on Plasma Science, Apr. 1991, pp. 309–323, vol. 19, No. 2.

B. Eliasson et al., "Nonequilibrium Volume Plasma Chemical Processing" IEEE Transactions on Plasma Science, Dec. 1991, pp. 1063–1077, vol. 19, No. 6.

R. Korzekwa et al., "Experimental Results Compariang Pulsed Corona and Dielectric Barrier Discharges for Pollution Control", submitted to IEEE International Pulsed Power Conference, Jun. 29–Jul. 2, 1997.

(List continued on next page.)

Primary Examiner—Don Wong
Assistant Examiner—Trinh Vo Dinh
(74) Attorney, Agent, or Firm—Gerald B. Hollins; Thomas L. Kundert

(57) ABSTRACT

An ionizing discharge device operating arrangement wherein initiation of discharges in for example a dielectric barrier discharge device is accomplished by a short circuit shunting of the charged electrodes of the device. A cycle of slow charging of the device inter-electrode capacitance followed by a high-speed electrode-shunting event is used for continuing operation of the device. In this operating cycle energy storage is accomplished by the inter-electrode capacitance of the device without causing ionization by way of a controlled rate of capacitance charging accomplished without assistance of additional storage elements. Desirable fast pulse rise-time energization characteristics are achieved in the dielectric barrier discharge device by way of using a fast, preferably electronic, switch in the shunting operation and maintaining the discharge in a circuit of relatively low inductance and minimal lead lengths.

6 Claims, 3 Drawing Sheets

OTHER PUBLICATIONS

N Beverini, G Cicconi, G L Genovesi and E Piano "$4s^3P_2$ metatable level density and temperature meassurement in a low–density argon plasma" Plasma Sources Sci. Technol. 6 (1997) 185–188.

G. Faure and S M Shkol'nik "Determination of rotational and vibrational temperatures in a discharge with liquid non–metallic electrodes in air at atmospheric pressure" j. Phus. D: Appl Phys. 31 (1998) 1212–1218.

R P Mildren and R J Carman "Enhanced performance of a dielectric barrier discharge lamp using short–pulsed excitation" 2001 IOP Publishing Ltd L1–L6.

M. Spaan, J Leistkow, V Schulz–Von Der Gathen and H F Dobele "Dielectric barrier discharges with steep voltage rise: laser absorption spectroscopy of NO concentrations and temperatures" Plasma Sources Sci. Technol. 9 (2000) 146–151.

Erwin H. W. M. Smulders, Bert E. J. M. Van Heesch and Sander S. V B. Van Paasen "Pulsed Power Corona discharges for Air Pollution Control" IEEE Transactions on Plasma Science, vol. 26, No. 5, Oct. 1998.

B. M. Penetrante, M. C. Hsiao, B. T. Merritt, G. E. Vogtlin, P. H. Wallman, M. Neiger, O. Wolf, T. Hammer and S. Broer "Pulsed corona and dielectric–barrier discharge processing of NO in $N_2$" App;. Phys. Lett. 68 (26) Jun. 24, 1996 3719–3721.

K. Behringer and U Fantz "Spectroscopic diagnostics of glow discharge plasma with non–Maxwellian electron energy distributions" J. Phys, D: Appl. Phys. 27 (1994) 2128–2135.

A N Goyette, J R Peck, Y Matsuda, L W Anderson and J E Lawler "Experimental comparison of rotational and gas kinetic temperatures in $N_2$ and He–$N_2$ discharges" J. Phys. D: Appl. Phys. 31 (1998) 1556–1564.

K Niemi, V Schulz–Von Der Gathen and H F Dobele "Absolute calibration of atomic density measurements by laser–induced fluorescence spectroscopy with two–photon excitation" J. Phys. D: Appl. Phys. 34 (2001) 2330–2335.

* cited by examiner

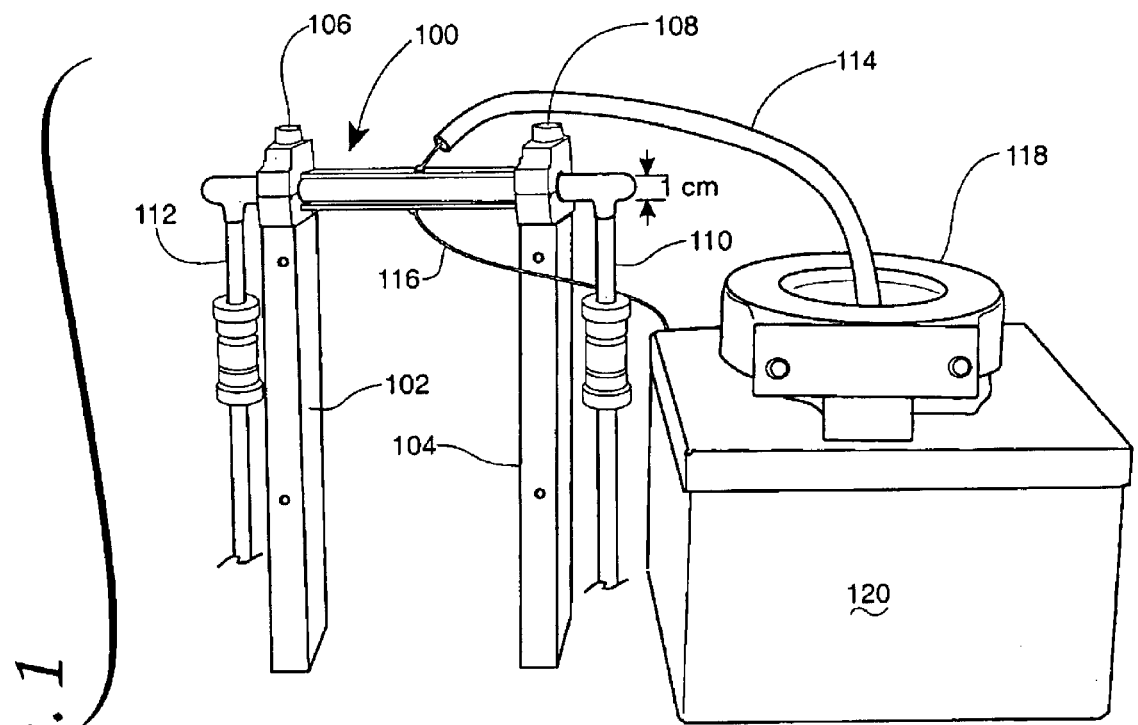
Fig. 1a
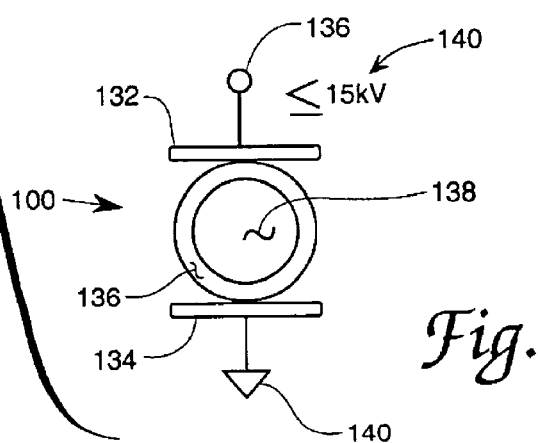
Fig. 1b
Fig. 1

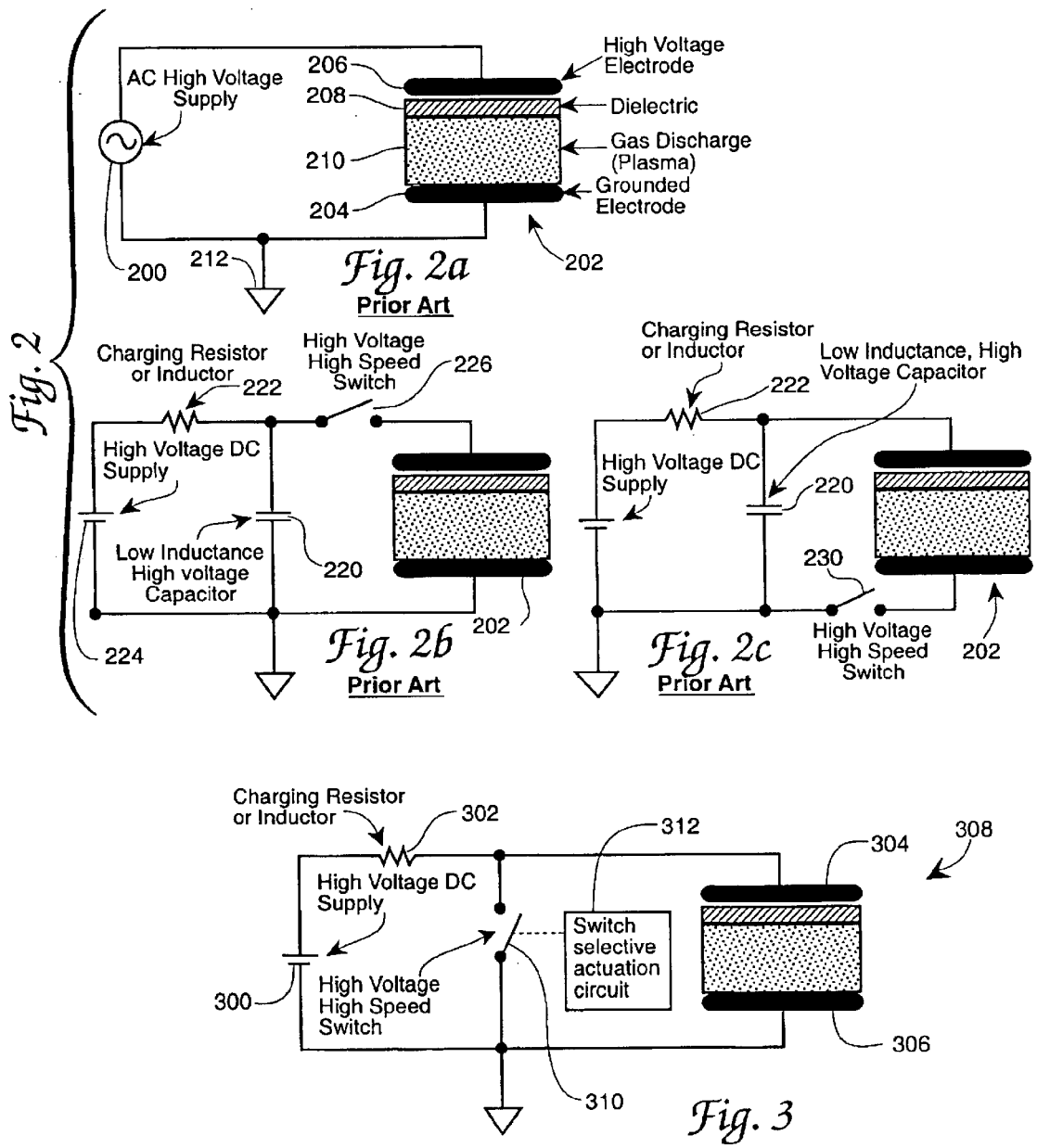

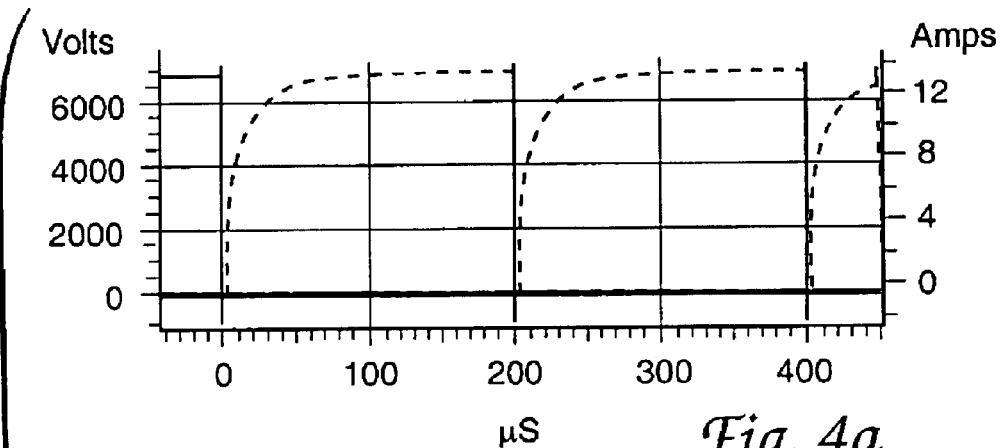
Fig. 4a
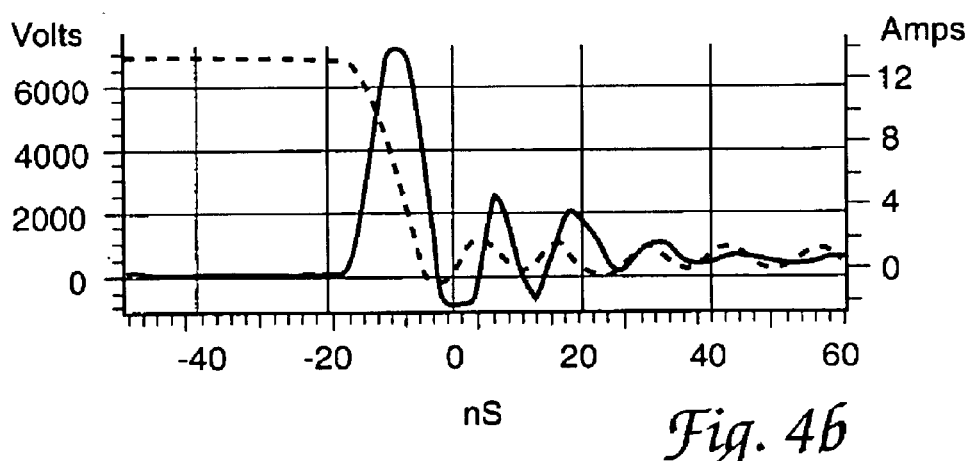
Fig. 4b
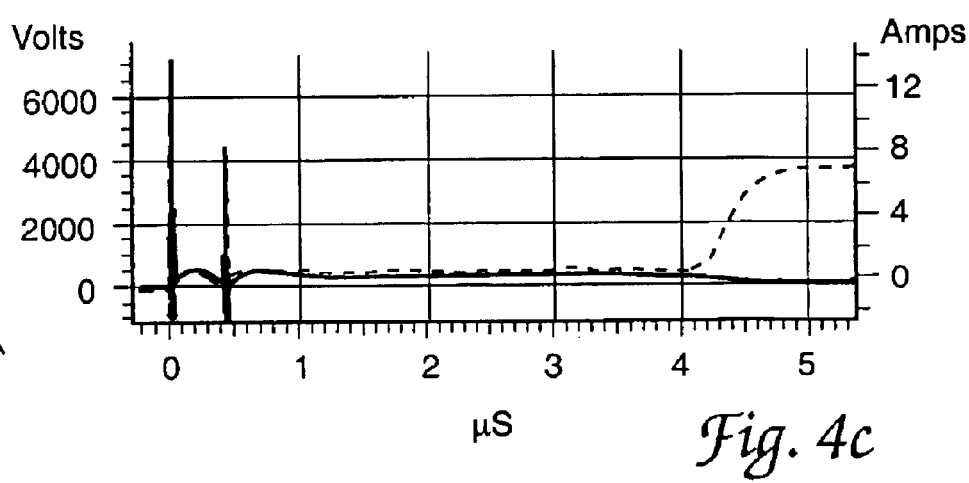
Fig. 4c
Fig. 4

US 6,831,421 B1

SHUNT-INDUCED HIGH FREQUENCY EXCITATION OF DIELECTRIC BARRIER DISCHARGES

RIGHTS OF THE GOVERNMENT

The invention described herein may be manufactured and used by or for the Government of the United States for all governmental purposes without the payment of any royalty.

BACKGROUND OF THE INVENTION

The dielectric barrier discharge is of current interest in the technical community as a result of its potential for use in surface modification applications as well as for service in environmental cleansing applications ranging for example from engine exhaust to sludge remediation. Of particular attraction in modern applications is the possible use of dielectric barrier discharge devices operating at ambient pressures rather than under the vacuum conditions often required for discharge phenomenon devices. A variety of energization and triggering arrangements for these dielectric barrier discharge devices have become known in the art, these arrangements usually involve a high voltage energy source supplemented by an additional source of triggering or discharge-initiating signal. Many of these energization arrangements are however so complex as to discourage use of the dielectric barrier discharge concept in simple low cost apparatus. The present invention is believed to provide assistance in resolving these difficulties.

SUMMARY OF THE INVENTION

The present invention provides an improved and simplified arrangement for energization of a dielectric barrier discharge device or similar device.

It is an object of the invention therefore to provide a simplified and electrically convenient circuit arrangement for energizing a dielectric barrier discharge device.

It is another object of the invention to provide enhanced understanding of the electrical operating characteristics of a plasma discharge apparatus such as a dielectric barrier discharge device.

It is another object of the invention to achieve the low gas temperature and high electron temperature advantages of dielectric barrier discharge device plasmas using a simplified energization arrangement for obtaining these plasmas.

It is another object of the invention to achieve energization of dielectric barrier discharge devices and similar devices in a manner offering improved safety and convenience for persons associated with the devices.

It is another object of the invention to provide a reliable dielectric barrier discharge device energization arrangement that is electronic in nature and can be achieved without moving parts.

It is another object of the invention to achieve the known advantages of high frequency energization of a dielectric barrier discharge device while avoiding the complexity and cost of conventional arrangements to accomplish such energization.

It is another object of the invention to provide a dielectric barrier discharge device energization arrangement that may be used with a plurality of differing types of electrical energy sources.

It is another object of the invention to provide a dielectric barrier discharge device energization arrangement seizing upon the advantages available with use of an impulse energized low inductance electrical circuit.

It is another object of the invention to provide a dielectric barrier discharge device energization arrangement in which either resistive or reactive decoupling may be used between energy source and low inductance portions of the apparatus.

It is another object of the invention to provide a dielectric barrier discharge device energization arrangement in which substantial parts of the apparatus can be permanently and safely operated at ground potential.

These and other objects of the invention will become apparent as the description of the representative embodiments proceeds.

These and other objects of the invention are achieved by the method of controlling plasma discharges in a gaseous dielectric barrier discharge device, said method comprising the steps of:

applying electrical charging energy to electrical terminals of a capacitance element comprised of electrically segregated conductive electrodes of said gaseous dielectric barrier discharge device;

said step of applying electrical charging energy comprising an electrical charging current flow of controlled first current amplitude and first capacitance charge-changing rate;

said step of applying electrical charging energy continuing until said electrical capacitance element achieves a charge voltage intermediate a minimum and a maximum dielectric barrier discharge initiating voltage characteristic of said gaseous dielectric barrier discharge device;

initiating a dielectric barrier discharge within said charged capacitance gaseous dielectric barrier discharge device by decreasing said achieved charge voltage at said capacitance element electrical terminals at a second, substantially faster capacitance charge-changing rate.

BRIEF DESCRIPTION OF THE DRAWING

The accompanying drawings incorporated in and forming a part of the specification, illustrate several aspects of the present invention and together with the description serve to explain the principles of the invention. In the drawings:

FIG. 1a in FIG. 1 shows a physical arrangement of apparatus in accordance with the present invention.

FIG. 1b in FIG. 1 shows certain additional cross sectional details of one element in the FIG. 1a drawing.

FIG. 2a in FIG. 2 shows an electrical schematic diagram relating to one prior art arrangement for energizing the FIG. 1 and other dielectric barrier discharge device and similar devices.

FIG. 2b in FIG. 2 shows an electrical schematic diagram relating to another prior art arrangement for energizing the FIG. 1 and other dielectric barrier discharge device and similar devices.

FIG. 2c in FIG. 2 shows an electrical schematic diagram relating to an additional prior art arrangement for energizing the FIG. 1 and other dielectric barrier discharge device and similar devices.

FIG. 3 shows an electrical schematic diagram relevant to the present invention energization of dielectric barrier discharge and similar devices.

FIG. 4a in FIG. 4 shows voltage and current relationships relevant to the present invention according to a first time scale.

FIG. 4b in FIG. 4 shows voltage and current relationships relevant to the present invention according to a second time scale.

FIG. 4c in FIG. 4 shows voltage and current relationships relevant to an undesired re-ignition event in the present invention and according to a third time scale.

DETAILED DESCRIPTION OF THE INVENTION

The FIG. 1a portion of FIG. 1 in the drawings shows physical details of a representative dielectric barrier discharge device 100 located in a laboratory setting. The FIG. 1 dielectric barrier discharge device is energizable in accordance with the present invention. The FIG. 1 drawing also shows in FIG. 1b certain additional cross sectional details of the dielectric barrier discharge device 100. The dielectric barrier discharge device shown in FIG. 1 is of course representative of numerous other arrangements of a dielectric barrier discharge or other devices of for example larger and smaller physical size and of related operating characteristics which may be improved-upon with use of the present invention.

In the FIG. 1a drawing the dielectric barrier discharge device 100 may for present example purposes be of one centimeter diameter and some ten centimeters in length and may be comprised of a glass or quartz tube having inlet and outlet ports 110 and 112 by which a stream of gases is admitted to and removed from the central active area of the device. For present example purposes this stream may be represented by a flow of Nitrogen or other gasses or gas mixtures at the inlet port 110 and a mixture of various product gases departing from the active area by way of outlet port 112. As is known in the dielectric barrier discharge device art these gases may exist under a wide range of pressures and temperature conditions including pressures and temperatures considered to be in the "room" conditions range during operation of the dielectric barrier discharge device 100. A flow of gases is desired in the dielectric barrier discharge device 100 in order to remove the altered gas products produced by the energy of the discharge occurring within the device. Other gases believed usable in a dielectric barrier discharge device such as the device 100 include air, Oxygen, methane and Xenon.

FIG. 1b in the FIG. 1 drawing shows several details of the dielectric barrier discharge device 100 that are best understood from a cross sectional drawings view of the device. These details include the enclosed region 138 that is surrounded by the closed glass or quartz tube 136 and adjoined by the metallic electrodes 132 and 134, electrodes that are in turn controlled electrically by way of the electrical terminal 136 and the grounding connection 140. Additional aspects relating to these electrical connections in FIG. 1b are disclosed subsequently herein. The two electrodes 132 and 134 separated by the dielectric of the glass or quartz material of the tube 136 and by the gases flowing within the region 138 of the tube 136 comprise the essential elements of a dielectric barrier discharge device.

Returning again to the FIG. 1a drawing, there also appears in this drawing a pair of plastic mounting clamps 106 and 108 by which the tube 136 of the dielectric barrier discharge device 100 is maintained in the illustrated physical condition of connection with the upright supports 102 and 104. Each of the FIG. 1b electrodes, 132 and 134, is shown in FIG. 1a to be connected by way of the electrical conductors 114 and 116 to the electrical pulse generator apparatus 120. The current transformer 118 of an electrical measuring and waveform viewing apparatus used with the FIG. 1 dielectric barrier discharge device is shown to surround the lead 114. In view of the needed operating potentials in the several kilovolts region (i.e., between five and up to fifteen kilovolts or greater indicated at 140 for the FIG. 1 dielectric barrier discharge device arrangement) a grounded and suitably ported protective shield, not shown in FIG. 1, is preferably disposed over the FIG. 1 components during their operation in a laboratory or other personnel-presence environments. In the case of the one-centimeter diameter dielectric barrier discharge device identified herein the electrodes 132 and 134 comprise an electrical capacitor of about twenty-seven picofarads electrical size.

Discussion relating to the FIG. 1a and FIG. 1b drawings has touched upon the electrical circuit arrangements usable to energize the FIG. 1 dielectric barrier discharge device 100; additional details of these arrangements may be appreciated from the three FIG. 2 drawings identified as FIG. 2a, FIG. 2b and FIG. 2c. In the FIG. 2a drawing for example there is shown a conventional high voltage alternating current arrangement for energization of a dielectric barrier discharge or similar device. FIG. 2a also provides details relating to the four essential elements of a somewhat minimal dielectric barrier discharge device. In the FIG. 2a drawing a source 200 of conventional sinusoidal waveform energy of several thousand volts peak magnitude is connected directly to the terminals of a dielectric barrier discharge device 202 in order that the device be energized into a breakdown condition during each alternating current cycle. As is known in the art with respect to dielectric barrier discharge devices, there are desirable advantages to be realized when the FIG. 2a source 200 operates at higher frequencies and in the fast rise-time pulsed mode of energization. For convenience and personnel safety reasons one terminal of the source 200 is usually grounded as is indicated at 212.

The somewhat minimal dielectric barrier discharge device 202 in FIG. 2a is shown to be comprised of a pair of conductive electrodes 204 and 206 separated by a dielectric material and an ionizable, plasma producing gas 210. As described in the literature it is the minute discharge regions located adjacent the dielectric material 206 that generate the effective high electron temperature plasmas and possible low neutral plasma gas temperature characteristics of a dielectric barrier discharge device. The FIG. 1 dielectric barrier discharge device may be appreciated to be in accordance with the FIG. 2a device with the modification of the FIG. 1 arrangement having a doubled dielectric material presence in the form of the glass or quartz tube 136 with wall portions adjacent each of electrodes 132 and 134.

FIG. 2b in the drawings shows the prior art arrangement often selected for energization of a dielectric barrier discharge device from a high-voltage pulsed source of energy. In the FIG. 2b circuit a low inductance energy storage capacitor 220 is charged from the source 224 by way of the resistor 222. The energy from capacitor 220 is delivered to the FIG. 2b dielectric barrier discharge device 202 upon closure of the high-speed switch 226. This switch is preferably embodied in the form of electronic devices such as transistors or silicon controlled rectifiers disposed in series or series-parallel configuration in view of the voltages involved. It is notable that each terminal of the switch 226 is disposed at an elevated potential with respect to ground. This disposition is something less than optimum from a circuit realization viewpoint since it requires all portions of the switch to be tolerant of high voltages and disposes high-voltage conductors in most areas of a circuit layout. During operation of the FIG. 2b circuit the charge received in capacitor 220 is transferred to the inherent capacitance formed by electrodes 204 and 206 until breakdown and discharge of the electrode capacitor occur.

The dielectric barrier discharge device energizing circuit shown in FIG. 2c of the drawings is similar to the arrangement of FIG. 2b except the high-speed switch 230 is relocated to a new position wherein one of its terminals can be operated at ground potential. The dielectric barrier discharge device 220 is however in this instance operated in a fully floating and only temporarily grounded condition that may be considered more hazardous to persons attending the device.

In contrast with the three FIG. 2 arrangements for energizing a dielectric barrier discharge device I have discovered that such devices can be energized and operated in what appears to be an elegantly simple manner; a manner combining several advantages of the heretofore described energizing arrangements into a single circuit. The circuit diagram for this believed-to-be significantly improved energization arrangement appears in FIG. 3 of the drawings herein. Details regarding this energization arrangement, not all of which are apparent from the simple FIG. 3 circuit diagram, are disclosed in the subsequent paragraphs and drawings herein.

As shown in the FIG. 3 drawing, the energization arrangement of the present invention functions by charging the inherent capacitance of the dielectric barrier discharge device 308 and electrodes 304 and 306 from a high-voltage source of electrical energy through use of the series resistance 302. Significantly this charging is caused to occur at a relatively slow rate, a rate provided by way of some combination of rounded pulse waveform, significant resistive/capacitive time constant between the resistor 302 and the inter-electrode capacitance of electrodes 304 and 306 or with the presence of an inductive element in lieu of or in addition to the resistance 302. It has been found that charging at this relatively slow rate can continue beyond the minimum possible triggering voltage for commencing a dielectric barrier discharge and into a range where more desirable and energetic dielectric barrier discharges are achieved so long as the charging occurs at this relatively slow rate. There is of course some maximum non-trigger charging voltage beyond which an initiation of the dielectric barrier discharge device will occur even with a relatively slow rate of voltage change waveform. Operation of the FIG. 3 dielectric barrier discharge device in this intermediate range between minimum and maximum charge voltages is desired in the FIG. 3 dielectric barrier discharge device 308.

Perhaps the most surprising aspect attending the FIG. 3 circuit diagram concerns the discharge event for the inter-electrode capacitance of electrodes 304 and 306. As may be surmised from the FIG. 3 circuit, I have found this discharge and commencement of the dielectric barrier discharge event may be efficiently achieved by shunting the charged inter-electrode capacitance of electrodes 304 and 306 with a high-speed shunting switch as is represented at 310. This shunting event and its accomplishment, i.e., a starting by shunting event, is of course an alternative, a simplified and advantageous alternative, to many usual initiating arrangement for a dielectric barrier discharge (and related devices ionizations) wherein an additional spike of DC or radio frequency energy is impressed on the charged inter-electrode capacitance to initiate a discharge. Although I have herein referred to the present invention event involving switch 310 as a discharging event or a shunting event and in terms of an ionization commencement I wish not to be bound by these descriptions or by my understanding of the perhaps complex combination of occurrences commencing upon closure of the switch 310. Several additional points of significance with respect to the sequence attending closure of switch 310 and commencement of the dielectric barrier discharge device ionization as I comprehend them are stated in the paragraphs following.

In one sense the FIG. 3 circuit may be considered a circuit having low inductance portions and to achieve initiation of an ionization event by way of impulse excitation of this low inductance portion of the circuit. When viewed in this manner the FIG. 3 circuit components to the left of switch 310 may be considered to be high impedance circuit portions with the resistance 302 providing decoupling from the right side low inductance portions. The low inductance circuit portion is composed of switch 310, dielectric barrier discharge device 308 and the leads joining these two elements i.e., the preferably short leads intermediate switch 310 and device 308. The closure of switch 310 in the presence of charge on the electrodes 304 and 306 of course sets up a fast rise time discharge of the electrode capacitance, a discharge inclusive of higher frequency Fourier transform components, and is thus desirable for energization of the dielectric barrier discharge device 308.

With respect to additional aspects of the FIG. 3 circuit, it has been known that breakdown in radio frequency or microwave frequency electric fields can occur at peak voltages lower than those of a DC breakdown. This fact can be viewed as providing additional theoretical explanation for the present invention starting by shunting event and its characteristics since events occurring in the closed loop path involving the just closed switch 310 and the dielectric barrier discharge device 308 are believed to include the fast pulse equivalent to high frequency discharge of the charged electrode capacitance. In view of the high-speed switch used at 310 a damped oscillatory discharge is observed to occur at radio or microwave frequencies and thereby to provide a desirable mode of operation for the dielectric barrier discharge device 308.

Even when a pulsed source of energy is used at 300 in FIG. 3 and high pulse repetition rates, for example 30 kHz, are employed the achieved pulse interval time is much longer than the switching time of modern high voltage semiconductor or semiconductor assisted magnetic switches, times which can be as short as 5 nanoseconds for example or even shorter. Such large differences between charging times and switch closing times enables use of the simplified dielectric barrier discharge device circuit shown in FIG. 3. With this FIG. 3 circuit moreover one switch electrode can be grounded, the other will be charged to the full voltage by a series connected resistor. To avoid the Ohmic losses encountered with a resistor and achieve an initially slower charge voltage rise time, an inductor of suitable electrical size may be used in lieu of the resistor 302 in FIG. 3. Due to the slow application of the charging voltage, the achieved voltage can be rather high before breakdown between the dielectric and the other electrode of the dielectric barrier discharge device occurs. When the charged electrode is suddenly discharged to ground by the fast high voltage switch, breakdown will occur practically instantaneously in the dielectric barrier discharge device 308. The breakdown occurs at high electric field strength, such that the chemical effectiveness of the resulting discharge plasma is very high.

The high-speed switch shown at 310 in FIG. 3 may be of the semiconductor or semiconductor assisted magnetic switch types. One possible class of the former of such switches is available from the German Behlke Electronic GMBH Corporation of Kronberg, Germany, WWW.behlke.de on the World Wide Web. The Behlke HTS 150 semiconductor switch of some 15 kilovolts and 30 amperes capacity has been found suitable for use with the invention in the switch 310 location. This switch includes a group of series and parallel-connected MOSFET transistors that are understood-to-be controlled by optic signals. The Behlke product line also includes a number of other switches including silicon controlled rectifier based switches that may be used in embodying the FIG. 3 arrangement of the invention, especially when lower voltages are employed. Since the Behlke switch is based on field effect transistors the bi-directional current to be expected during ringing discharge of the dielectric barrier discharge device capacitance does not present a switch polarity difficulty. Another supplier of switches suitable for use at 310 in the FIG. 3 circuit is the American company known as Diversified Technologies Incorporated of 35 Wiggins Avenue, Bedford, Mass., www.divtecs.com on the World Wide Web. The Diversified Technologies switches are for example said to be more reliable, faster operating and more efficient than vacuum switch tubes. A "selective actuation circuit" for the switch 310 is shown at 312 in the FIG. 3 drawing; this circuit may for example include signal sources relevant to the optical signals described above and also include circuits relating to the below discussed FIG. 4 waveforms herein.

As may be partially appreciated from the FIG. 1 view of an embodiment of the invention it is found desirable to use low resistance and low inductance conductors in the portions of the FIG. 3 circuit that are subjected to the high current flows of dielectric barrier discharge device discharges, i.e., in the switch and dielectric barrier discharge device wiring or the low inductance parts of the circuit. Such conductors contribute to the occurrence of fast rise time waveforms in the discharge current and a minimal loss of energy to Ohmic or other losses.

FIG. 4 in the drawings shows current and voltage waveforms relevant to the charging and discharging or triggering of a dielectric barrier discharge device according to the present invention. In the FIG. 4 waveforms the dashed lines represent dielectric barrier discharge device voltage as measured on the leftmost vertical scale of the graph and the heavy lines represent dielectric barrier discharge device current as measured on the rightmost vertical scale of the graph. Three different time measurement scales, as found on the horizontal axis of the FIG. 4 graphs, are used in the FIG. 4 drawings. The FIG. 4 waveforms originate with a dielectric barrier discharge device comprised of a one-centimeter diameter Nitrogen filled Pyrex tube of 50 Torr pressurization and attendance by external electrodes of one-centimeter width and ten centimeter length.

In FIG. 4*a* of the FIG. 4 drawing there is shown one voltage waveform usable to achieve a suitably slow charging of the dielectric barrier discharge device inter-electrode capacitance in the FIG. 3 circuit. The pulse repetition frequency represented in the FIG. 4*a* drawing is five kilohertz and provides a 200 microsecond charging time. The rounded top left corner and asymptotic top portion of each pulse in the FIG. 4*a* waveform are sufficiently slow so as to preclude an initiation of the dielectric barrier discharge during capacitor charging portions of the operating cycle. The rounding in the FIG. 4*a* waveforms is prominent notwithstanding use of the illustrated 100 microseconds per division scale of the FIG. 4*a* drawing; with use of a smaller number of microseconds per division scale this rounding would be even more pronounced.

FIG. 4*b* in the drawings shows the inter-electrode capacitance charging and discharging waveforms as they are referenced to the time of a dielectric barrier discharge device triggering and with use of a shorter time interval in the horizontal scale. The FIG. 4*b* waveforms originate with a digital sampling oscilloscope and therefore include representations of events occurring prior to the device triggering. Radio frequency ringing as described above is present on both the voltage and current waveform in the FIG. 4*b* drawing following the approximately 15 nanosecond current pulse.

FIG. 4*c* in the drawings shows an undesirable waveform configuration for operation of the FIG. 3 circuit. In the FIG. 4*c* drawing charging voltage has been reapplied within about 0.4 microsecond of a discharge event and re-ignition of the dielectric barrier discharge device has occurred. After about 4 microseconds however the discharge is recovered and charging of the storage capacitance begins again without re-ignition. By reducing the resistance of the charging resistor the charging time can be reduced. The minimum charging resistance is determined by remnant discharge ionization for the particular gas used in the dielectric barrier discharge device and its gas pressure and the need to prevent premature re-ignition. An inductive charge system having a lower initial voltage rise rate can improve the charging conditions.

Although a relatively wide range of voltage waveform rise times may be used successfully in the charging and discharging of the inter-electrode-capacitance of the dielectric barrier discharge device 308 in the manner of the present invention it is believed helpful to mention here the following representative values of capacitance charging rise time and capacitance discharging fall times that have been successfully achieved and used to accomplish satisfactory operation of the invention. For capacitance charging for example a rise time of thirty-three microseconds or a dv/dt rate of $3 \times 10^8$ volts per second has been satisfactory and is readily achieved. For capacitance discharging for example a fall time of ten nanoseconds or a dv/dt rate of $10^{12}$ volts per second has been achieved and used to cause dielectric barrier discharge device ionization.

Several implementation conveniences and other advantages are achieved with the dielectric barrier discharge device arrangement of the present invention, these conveniences and advantages include:

1. A simple electrical shunting operation initiates plasma ionization.
2. Minimal device energization circuitry
3. One pole of the shunting switch is permanently grounded and requires no high voltage insulation.
4. One electrode of the dielectric barrier discharge device is also permanently grounded.
5. A low inductance capacitor is not needed in the circuit.
6. Only the switch and dielectric barrier discharge device wiring need be of heavy and low inductance nature.
7. High frequency characterized energization of the dielectric barrier discharge device occurs notwithstanding an absence of express radio frequency energization apparatus.
8. Magnitude scaleable energization as determined by an application at hand is achievable.

While the apparatus and method herein described constitute a preferred embodiment of the invention, it is to be understood that the invention is not limited to this precise form of apparatus or method and that changes may be made therein without departing from the scope of the invention which is defined in the appended claims.

I claim:

1. Ionization gas tube apparatus comprising the combination of:
   an elongated closable electrical insulating gas flow containment tube;
   a first electrode member, including a first electrical terminal, disposed along a lengthwise peripheral surface of said gas flow containment tube;
   a second electrode member, including a second electrical terminal, lengthwise disposed along a diametrically opposed peripheral surface of said gas flow containment tube;
   a source of electrode capacitance-charging unidirectional electrical energy of selected first dv/dt waveform characteristics connected with said first and second electrode electrical terminals;
   an electrical shunting switch member of selected, second, faster, gas tube gas flow ionizing dv/dt waveform characteristics connected with said first and second electrode electrical terminals; and
   gas tube flow ionizing controller apparatus including an electrical shunting switch member selective actuation circuit.

2. The ionization gas tube apparatus of claim 1 wherein said first dv/dt waveform characteristics comprise an electrode capacitance-charging rise time of not more than $3 \times 10^8$ volts per centimeter.

3. The ionization gas tube apparatus of claim 1 wherein said selected, second, faster, gas tube gas flow ionizing dv/dt waveform characteristics comprise an electrode capacitance-discharging fall time of not more than ten nanoseconds.

4. The ionization gas tube apparatus of claim 1 wherein said electrical shunting switch member of selected, second, faster, gas tube gas flow ionizing dv/dt waveform characteristics is comprised of semiconductor electronic devices.

5. Ionization gas tube apparatus comprising the combination of:
   an electrically insulating gas containment tube enclosing a selected gas flow;
   a first electrode member including a first electrical terminal disposed along a lengthwise peripheral surface of said gas containment tube;
   a second electrode member including a second electrical terminal disposed along an opposed lengthwise peripheral surface of said gas containment tube;
   electrical energy source means connected with said first and second electrode electrical terminals for charging an electrical capacitance element comprised of said first and second electrode members at a gaseous ionization-free, slow, first voltage change rate; and
   electrical shunt switch means connected with said first and second electrode electrical terminals for generating fast, second voltage change rate, flowing gas-ionizing, short circuit currents in said first and second electrode members.

6. The ionization gas tube apparatus of claim 5 wherein said electrical energy source means comprises a pulsed source of electrical energy having a selected rate of pulse voltage rise time.

* * * * *